(12) United States Patent
Miura

(10) Patent No.: US 9,308,575 B2
(45) Date of Patent: Apr. 12, 2016

(54) POWER TRANSMISSION CHAIN PIN AND MANUFACTURE METHOD THEREOF

(75) Inventor: Yoshihisa Miura, Yamatokoriyama (JP)

(73) Assignee: JTEKT CORPORATION, Osaka, Osaka-shi (JP)

( * ) Notice: Subject to any disclaimer, the term of this patent is extended or adjusted under 35 U.S.C. 154(b) by 98 days.

(21) Appl. No.: 13/336,941

(22) Filed: Dec. 23, 2011

(65) Prior Publication Data

US 2012/0090290 A1 Apr. 19, 2012

Related U.S. Application Data

(62) Division of application No. 12/010,990, filed on Jan. 31, 2008, now abandoned.

(30) Foreign Application Priority Data

Feb. 1, 2007 (JP) .................................. 2007-022576

(51) Int. Cl.
*B21J 5/08* (2006.01)
*B21K 1/00* (2006.01)
*B21C 3/04* (2006.01)
(Continued)

(52) U.S. Cl.
CPC ... *B21J 5/08* (2013.01); *B21C 3/04* (2013.01); *B21F 11/00* (2013.01); *B21K 1/00* (2013.01); *B21K 1/06* (2013.01); *B21K 1/44* (2013.01); *B21L 9/04* (2013.01); *B21L 9/065* (2013.01);
(Continued)

(58) Field of Classification Search
CPC ............... B21L 9/04; B21L 9/02; B21L 9/06; B21L 9/065; B21L 1/04; B21L 1/10; B21L 11/12; B21L 11/14; F16G 5/18; B21J 5/08; B21K 1/44; B21K 1/00

USPC ............... 72/466; 474/212–216; 59/7–9, 35.1
See application file for complete search history.

(56) References Cited

U.S. PATENT DOCUMENTS 1,580,910 A * 4/1926 Layman et al. ................ 474/213
3,410,084 A * 11/1968 Cain .................................. 59/8
(Continued)

FOREIGN PATENT DOCUMENTS

| EP | 1 698 801 A1 | 9/2006 |
|----|--------------|--------|
| JP | 2004-251385 | 9/2004 |

(Continued)

OTHER PUBLICATIONS

European Search Report dated Mar. 3, 2011.

*Primary Examiner* — Shelley Self
*Assistant Examiner* — Mohammad I Yusuf
(74) *Attorney, Agent, or Firm* — McGinn IP Law Group PLLC

(57) ABSTRACT

A method of manufacturing a power transmission chain pin, which connects links arranged in a chain width direction of a power transmission chain, includes a rough sectional shape formation step of drawing a wire rod so that a section thereof is formed in a substantially oval shape and a rough end portion shape formation step of cutting a continuous bar-like member which has been subjected to the drawing work into a predetermined length so that an end surface thereof has a predetermined angle with respect to an axial direction. A final sectional shape and a final end portion shape of the power transmission chain pin are formed by a cold forging work to the bar-like member cut into the predetermined length, which is a final shape formation step.

6 Claims, 7 Drawing Sheets

(51) Int. Cl.
- *B21F 11/00* (2006.01)
- *B21K 1/06* (2006.01)
- *B21K 1/44* (2006.01)
- *B21L 9/04* (2006.01)
- *B21L 9/06* (2006.01)
- *B23D 15/00* (2006.01)
- *F16G 5/18* (2006.01)

(52) U.S. Cl.
CPC ............... *B23D 15/002* (2013.01); *F16G 5/18* (2013.01); *Y10T 29/49783* (2015.01)

(56) References Cited

U.S. PATENT DOCUMENTS

| | | | |
|---|---|---|---|
| 3,916,709 A | 11/1975 | Steuer et al. | |
| 4,608,036 A * | 8/1986 | Dono | 474/201 |
| 5,378,205 A | 1/1995 | Gohl et al. | |
| 5,728,021 A | 3/1998 | van Rooij et al. | |
| 6,260,345 B1 | 7/2001 | Kanehira et al. | |
| 6,393,819 B1 * | 5/2002 | Matsuno et al. | 59/35.1 |
| 6,427,433 B1 | 8/2002 | Kubota et al. | |
| 6,524,204 B2 | 2/2003 | Wakabayashi et al. | |
| 7,806,794 B2 * | 10/2010 | Fuse | 474/215 |
| 2004/0152549 A1 * | 8/2004 | Nishimoto et al. | 474/214 |
| 2005/0187057 A1 | 8/2005 | Lou | |
| 2007/0026988 A1 | 2/2007 | Fuse | |
| 2007/0178738 A1 * | 8/2007 | Yasuhara et al. | 439/310 |
| 2007/0179003 A1 * | 8/2007 | Vornehm et al. | 474/215 |
| 2007/0197330 A1 * | 8/2007 | Vornehm et al. | 474/215 |

FOREIGN PATENT DOCUMENTS

| | | |
|---|---|---|
| JP | 2006-116563 | 5/2006 |
| JP | 2007-032820 | 2/2007 |

\* cited by examiner

POWER TRANSMISSION CHAIN PIN AND MANUFACTURE METHOD THEREOF

The present invention is a Divisional Application of U.S. patent application Ser. No. 12/010,990 filed on Jan. 31, 2008, now abandoned which is based on and claims priority to Japanese Application No. P2007-022576 filed on Feb. 1, 2007, the subject matter of which is incorporated herein in its entirety.

BACKGROUND OF THE INVENTION

1. Field of the Invention

The present invention relates to a power transmission chain pin and a manufacture method thereof, and more specifically, to a power transmission chain pin suitable for a continuously variable transmission (CVT) of a vehicle such as an automobile and a manufacture method thereof.

2. Related Art

As shown in FIG. 9, as a continuously variable transmission for an automobile, there is a known chain type continuously variable transmission including a drive pulley (2) which has a stationary sheave (2a) and a movable sheave (2b) and which is disposed in an engine; a driven pulley (3) which has a stationary sheave (3b) and a movable sheave (3a) and which is disposed in a drive wheel; and a power transmission chain (1) with an endless shape which is wound around the pulleys. At this time, a hydraulic actuator allows the movable sheaves (2b) and (3a) to move close or away to or from the stationary sheaves (2a) and (3b) so as to clamp the chain (1) by hydraulic pressure. By means of the clamp force, a contact load occurs between the pulleys (2) and (3) and the chain (1) so as to transmit a torque by a friction force of the contact portion.

Also, JP-A-2004-251385 discloses a power transmission chain including a plurality of links having front and back insertion through holes through which pins are inserted; and a plurality of first and second pins which connect links, which are arranged in the chain width direction so as to allow the front insertion through hole of one link to correspond to the back insertion through hole of the other link, so as to be bendable in the longitudinal direction. In JP-A-2004-251385, the pin is manufactured such that a predetermined bar-like intermediate material is formed by a forging work, a turning work, a cutting work, and then a grinding work is performed on the bar-like intermediate material so as to allow a pin section to have a predetermined shape.

In the power transmission chain in JP-A-2004-251385, a plurality of pins are used, but it takes much time for working a pin, since an end portion of the pin needs to be subjected to a grinding work, which induces an increase in manufacture cost.

SUMMARY OF THE INVENTION

An object of the invention is to provide a power transmission chain pin capable of reducing a manufacture cost by reducing a pin work time, and a manufacture method thereof.

According to an aspect of the invention, there is provided a power transmission chain pin which is press-fitted to links arranged in a chain width direction of a power transmission chain, the power transmission chain pin comprising:

a guide portion disposed in at least one end portion of the power transmission chain pin and inclined so as to gradually increase a press-fitting margin to facilitate a press-fitting operation, wherein the guide portion is formed by a cold forging work.

In the power transmission chain according to the invention, in general, two types of pins (first and second pins) with a different sectional shape are used, and at least one of the first and second pins comes into contact with the pulley so as to transmit a power by the friction force. In the chain in which one of pins comes into contact with the pulley, one of the first and second pins corresponds to a pin (hereinafter, referred to as "first pin" or "pin") which comes into contact with the pulley at the time the chain is used in a continuously variable transmission, and the other thereof corresponds to a pin (which is called "interpiece" or "strip", and hereinafter, referred to as "second pin" or "interpiece") which does not come into contact with the pulley. The section of the first pin needs to be formed in a predetermined curvature shape (double rounded shape, sphere, etc.), but the section of the second pin needs not to be formed in a predetermined curvature shape. However, it is desirable to form a guide portion in the end portion thereof in that all of the first and second pins are press-fitted to the links. At this time, the guide portion is formed by a cold forging work.

As a material of the pin, appropriate steel such as bearing steel is used.

In a known power transmission chain, a front end portion upper edge of the pin is first press-fitted to a through-hole of the link, and a front end portion lower edge thereof is press-fitted to a through-hole thereof later on. On the contrary, in the power transmission chain pin according to the invention, for example, the end portion of the pin is provided with the guide portion for allowing the upper and lower edges of the pin to be press-fitted thereto at the same time. The guide portion may be provided on an end portion which corresponds to a front end side at the time of carrying out the press-fitting operation, and may be provided on both end portions if necessary.

In general, the pin having such a guide portion is manufactured as follows:

A drawing work is performed on a wire rod so as to have a required sectional shape. Subsequently, a pressing work is performed thereon so as to obtain an end surface with an inclined shape. Subsequently, a heat treatment work is further performed thereon. Subsequently, a grinding (or polishing) work is performed thereon by a grinding stone. However, the guide portion of the power transmission chain pin according to the invention is formed by a cold forging work.

According to another aspect of the invention, there is provided a method of manufacturing a power transmission chain pin which connects links arranged in a chain width direction of a power transmission chain, the method comprising:

a rough sectional shape formation step of drawing a wire rod so that a section thereof is formed in a substantially oval shape; and a rough end portion shape formation step of cutting a continuous bar-like member which has been subjected to the drawing work into a predetermined length so that an end surface thereof has a predetermined angle with respect to an axial direction;

wherein a final sectional shape and a final end portion shape of the power transmission chain pin are formed by a cold forging work to the bar-like member cut into the predetermined length, which is a final shape formation step.

The above-described method does not include a grinding step of grinding an end portion of the bar-like member of a predetermined length by a grinding stone.

Since the sectional shape obtained in the rough sectional shape formation step needs not to be a final shape, the sectional shape is determined in consideration of facilitation for a drawing work and a treatment work in the subsequent step. Accordingly, the sectional shape may be formed in an oval shape or a shape in which a part of an oval is a straight line. The predetermined angle with respect to the axial direction in the rough end portion shape formation step is set to an inclination angle corresponding to the inclined surface of the pulley in case of the first pin which comes into contact with the pulley. The predetermined angle is not particularly limited in case of the second pin which does not come into contact with the pulley, but may be set to an angle perpendicular to the axial direction or an inclination angle corresponding to the inclined surface of the pulley. In general, the final shape formation step includes a plurality of steps (using a plurality of molding dies). In this case, the final sectional shape may be first formed or the final end portion shape may be first formed.

"The grinding step of performing a grinding work by a grinding stone" includes all cutting works using a grinding stone, regardless of an obtained surface roughness. In the method of manufacturing the power transmission chain pin according to the invention, a barrel work or a heat treatment work which are surface finishing works other than the cutting works may be carried out if necessary.

According to the method of manufacturing the power transmission chain pin according to the invention, it is possible to manufacture the power transmission chain pin without the grinding step of grinding the end portion of the bar-like member, which has been cut into a predetermined length, using a grinding stone. Since the method does not include the grinding step, a work time is reduced. Additionally, it is not necessary to use a grinding fluid of which a waste fluid deteriorates an environment.

The power transmission chain pin according to the invention and the pin which is manufactured by the method of manufacturing the power transmission chain pin according to the invention may be appropriately applicable to a power transmission chain including a plurality of links having front and back insertion through holes through which the pin is inserted; and a plurality of first and second pins which are arranged in front and back thereof and which connect the links arranged in the chain width direction so that the front insertion through hole of one link corresponds to the back insertion through hole of the other link. At this time, the first and second pins move while coming into rolling contact with each other, so that the links are bendable in the longitudinal direction. One of the first and second pins is press-fitted to the front insertion through hole of one link to be fixed and is fitted to the back insertion through hole of the other link so as to be movable. The other pin is fitted to the front insertion through hole of one link so as to be movable and is press-fitted to the back insertion through hole of the other link so as to be fixed thereto.

In this case, an example of a material of the link includes a spring steel or a carbon tool steel. An example of a material of the link is not limited to the spring steel or the carbon tool steel, but may be, of course, other steel such as a bearing steel. For example, the link is manufactured such that a steel sheet is subjected to a press punching work, a barrel work, and a heat treatment work, and a shot work.

It is desirable that the press-fitting operation of the pin is carried out at the edge (upper and lower edges) of a portion perpendicular to the longitudinal direction of the insertion through hole. For example, the power transmission chain is manufactured such that necessary pins are vertically held on a table and then one sheet of link or multiple sheets of links are press-fitted thereto.

The power transmission chain to which the pin according to the invention is applied may be appropriately used in a power transmission apparatus including a first pulley which has a sheave surface with a conical shape; a second pulley which has a sheave surface with a conical shape; and a power transmission chain which is wound around the first and second pulleys. Such a power transmission apparatus may be appropriately used as a continuously variable transmission of an automobile etc.

Further, in a power transmission chain comprising:

a plurality of links each of which has a front insertion through hole and a back insertion through hole through which pins are inserted; and first pins and second pins connecting bendably the links in a chain longitudinal direction such that the front insertion through hole of one link corresponds to the back insertion through hole of another link which is arranged to overlap with said one link in a chain width direction, at least one of the first pins and second pins may be the power transmission chain pin as described above.

The above described method of manufacturing a power transmission chain pin may be carried out in such a state that a lower die used in the cold forging for forming the final end portion shape of the power transmission chain pin includes a concave portion for forming a guide portion of the power transmission chain pin, and an upper die includes a concave portion for forming a surface of the power transmission chain pin coming into contact with a conical sheave surface of a pulley, and the final end portion shape of the pin is formed by hitting a surface of the power transmission chain pin opposite to the guide portion by a punch.

According to the power transmission chain pin and the manufacture method thereof, since a cold forging work is carried out, it is not necessary to carry out a cut step. Accordingly, it is possible to reduce a pin work time, and thus it is possible to reduce a manufacture cost. Moreover, it is possible to prevent a deterioration of an environment due to a grinding waste fluid.

DETAILED DESCRIPTION OF THE PREFERRED EMBODIMENTS

Hereinafter, an exemplary embodiment of the invention will be described with reference to the accompanying drawings. In the description as below, "upper and lower" indicates upper and lower sides in FIG. 2.

Figure 1:
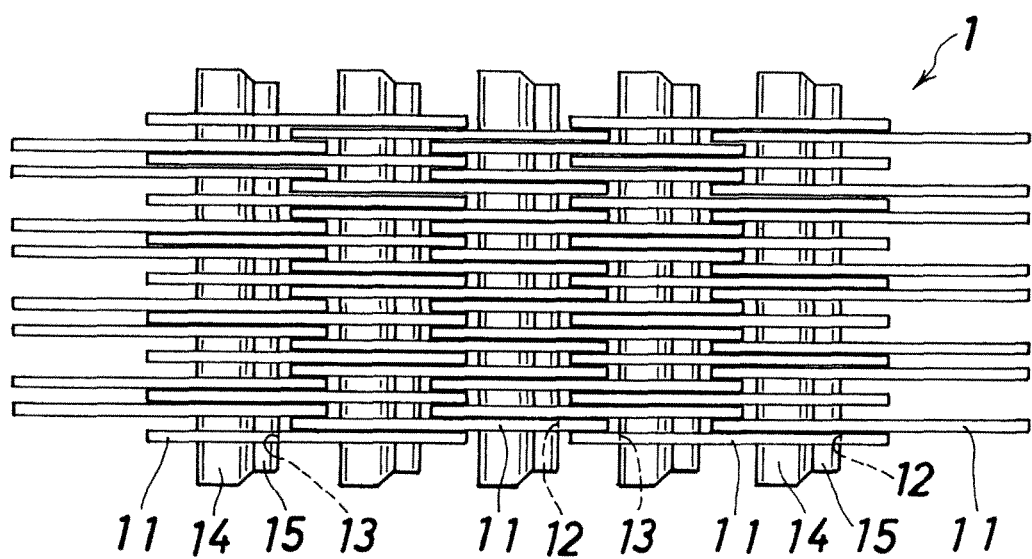
FIG. 1 is a top view illustrating a part of a power transmission chain to which a power transmission chain pin according to the invention is applied.

FIG. 1 illustrates a part of a power transmission chain to which a power transmission chain pin according to the invention is applied. A power transmission chain (1) includes a plurality of links (11) which have a front insertion through hole (12) and a back insertion through hole (13) arranged at a predetermined distance in a chain length direction, and a plurality of pins (first pin) (14) and interpieces (second pin) (15) which connect the links (11) arranged in the chain width direction so as to be bendable in the chain length direction. The interpiece (15) is shorter than the pin (14). The interpiece (15) is disposed in the front side and the pin (14) is disposed in the back side so as to be opposed to the interpiece (15).

One link unit is configured by arranging three link rows having a plurality of links with a coordinate phase arranged in the width direction in the chain movement direction (front/back direction). The chain (1) is configured by plurally connecting the link unit having the three link rows in the chain movement direction. In the embodiment, two of the link row having eight sheets of links and the link row having nine sheets of links configure one link unit.

Figure 2:
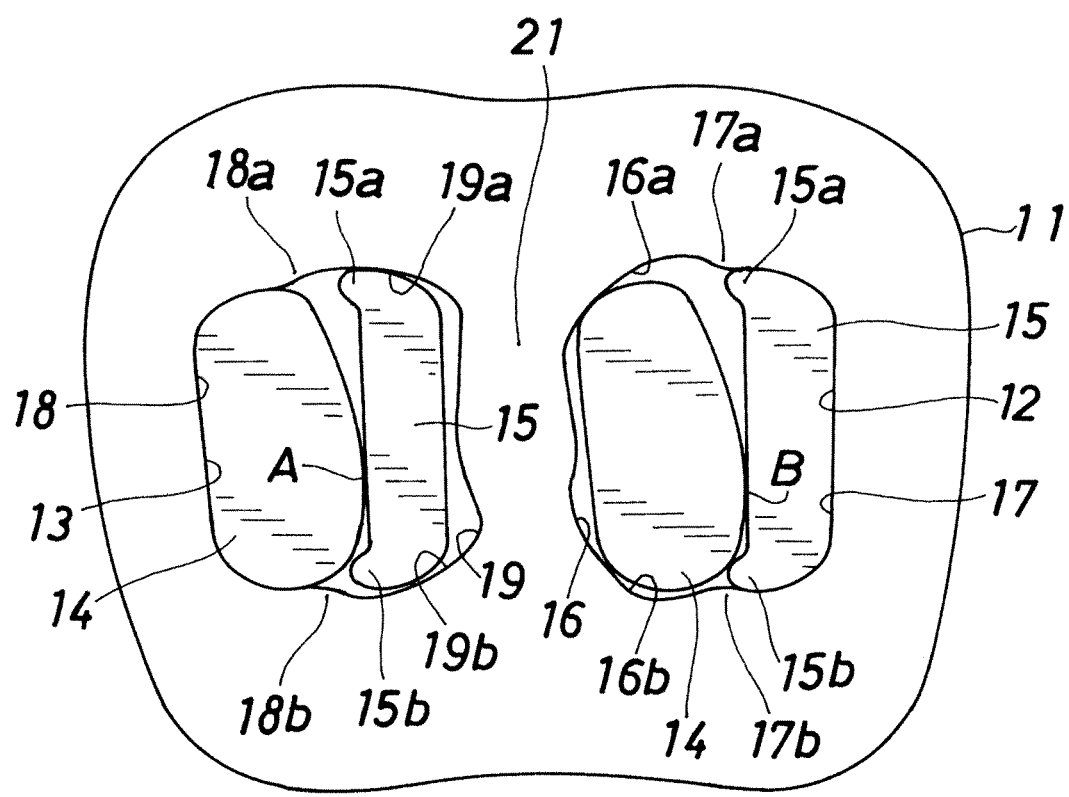
FIG. 2 is an enlarged side view of a link.

As shown in FIG. 2, a column portion (21) is interposed between the front insertion through hole (12) and the back insertion through hole (13) of the link (11). The front insertion through hole (12) includes a pin movable portion (16) to which the pin (14) is movably fitted and an interpiece fixation portion (17) to which the interpiece (15) is fixed. The back insertion through hole (13) includes a pin fixation portion (18) to which the pin (14) is fixed and an interpiece fixation portion (19) to which the interpiece (15) is movably fitted.

The width of the pin (14) is larger than that of the interpiece (15) in the front/back direction. In the upper and lower edges of the interpiece (15), protrusion edge portions (15a) and (15b) which extend toward the pin (14) are disposed.

In FIG. 2, positions denoted by Signs A and B are lines (point in a sectional view) where the pin (14) and the interpiece (15) come into contact with each other in the straight line portion of the chain (1). A distance between A and B is a pitch.

At the time of connecting the links (11) arranged in the chain width direction, the links (11) overlap with each other so that the front insertion through hole (12) of one link (11) corresponds to the back insertion through hole (13) of the other link (11). Subsequently, the pin (14) is fixed to the back insertion through hole (13) of one link (11) and is movably fitted to the back insertion through hole (12) of the other link (11). Subsequently, the interpiece (15) is movably fitted to the back insertion through hole (13) of one link (11) and is fixed to the front insertion through hole (12) of the other link (11). Accordingly, the pin (14) and the interpiece (15) move while coming into rolling contact with each other, and thus the links (11) are bendable in the length direction (front/back direction).

At the boundary portion between the pin fixation portion (18) of the link (11) and the interpiece movable portion (19), there is provided upper and lower hold portions (18a) and (18b) with a convex arc shape which are connected to upper and lower guide portions (19a) and (19b) with a concave arc shape of the interpiece movable portion (19) and which hold the pin (14) fixed to the pin fixation portion (18). In the same manner, at the boundary portion between the interpiece fixation portion (17) and the pin movable portion (16), there is provided upper and lower hold portions (17a) and (17b) with a convex arc shape which are connected to upper and lower guide portions (16a) and (16b) with a concave arc shape of the pin movable portion (16) and which hold the interpiece (15) fixed to the interpiece fixation portion (17).

A trace of a contact position between the pin (14) and the interpiece (15) on the basis of the pin (14) is formed in an involute curve. In the embodiment, a contact surface of the pin (14) is formed in an involute shape in a sectional view so as to have a basic circle having a radius Rb and a center M, and a contact surface of the interpiece (15) is formed in a flat surface (straight line in a sectional view). Accordingly, when the link (11) moves from the straight line portion to the curve portion of the chain (1) or moves from the curve portion to the straight line portion, in the front insertion through hole (12), the pin (14) moves in the pin movable portion (16) while the contact surface comes into rolling contact (which includes a slight sliding contact) with the contact surface of the interpiece (15) with respect to the interpiece (15) which is in the fixed state. In the back insertion through hole (13), the interpiece (15) moves in the interpiece movable portion (19) while the contact surface comes into rolling contact (which includes a slight sliding contact) with the contact surface of the pin (14) with respect to the pin (14) which is in the fixed state.

In the power transmission chain (1), since the pin moves repeatedly in the vertical direction, a polygonal vibration occurs, which causes a noise. However, since the pin (14) and the interpiece (15) move while coming into rolling contact with each other and the trace of the contact position between the pin (14) and the interpiece (15) on the basis of the pin (14) is formed in an involute curve shape, it is possible to reduce the vibration compared with a case where the contact surfaces of the pin and the interpiece are formed in an arc shape. Accordingly, it is possible to reduce the noise.

Figure 8:
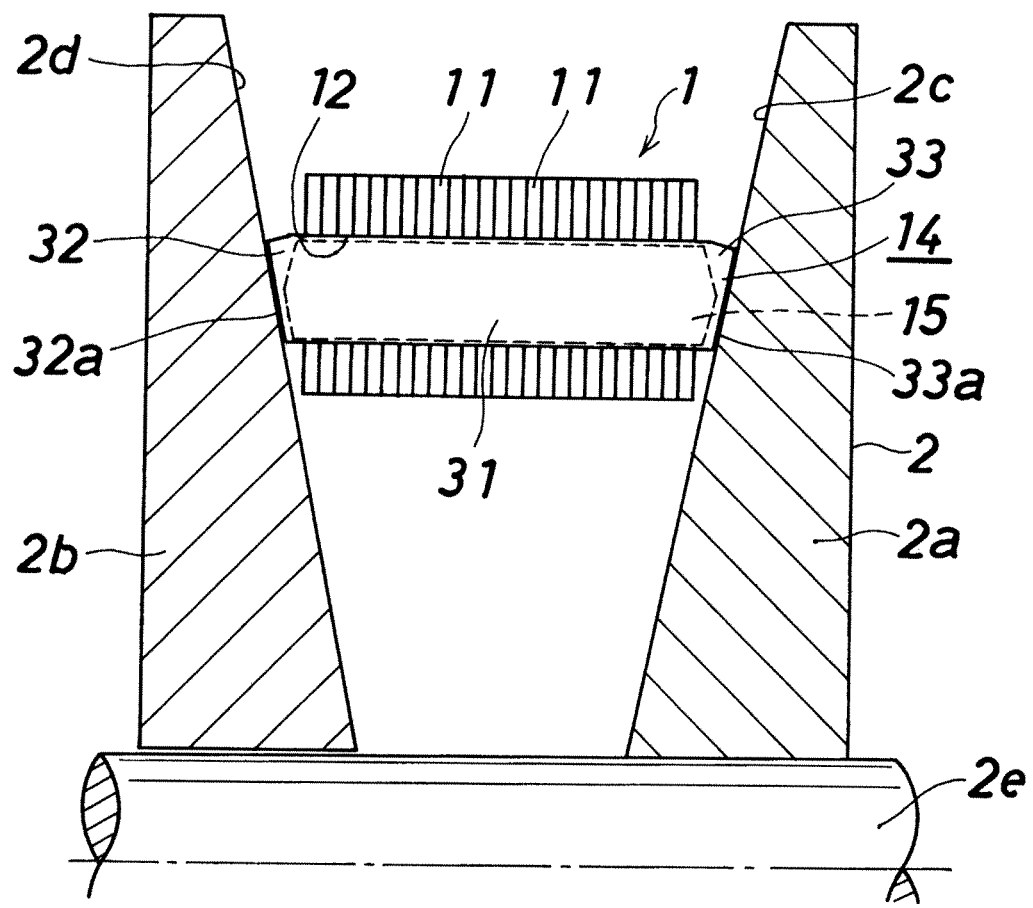
FIG. 8 is a front view illustrating a state where the power transmission chain is attached to a pulley.
Figure 9:
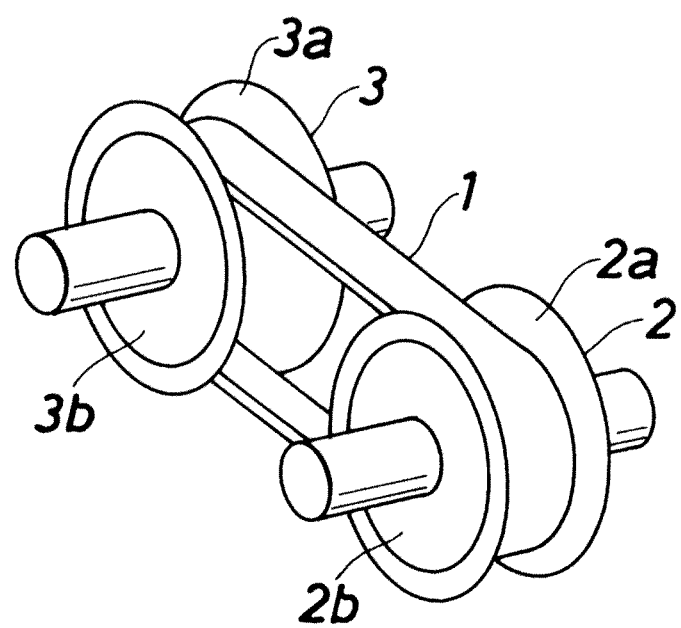
FIG. 9 is a perspective view illustrating a continuously variable transmission.

The power transmission chain (1) is used in a pulley type CVT shown in FIG. 8. However, at this time, the end surface of the pin (14) comes into contact with sheave surfaces (2c) and (2d) with conical shapes of the pulley (2) in the state where the end surface of the interpiece (15) does not come into contact with the sheave surfaces (2c) and (2d) with the conical shapes of a stationary sheave (2a) and a movable sheave (2b) of the pulley (2) having a pulley shaft (2e), and then a power is transmitted by a friction force generated by the contact. As described above, since the pin (14) and the interpiece (15) move while coming into rolling contact with each other, the pin (14) hardly rotates with respect to the sheave surfaces (2c) and (2d) of the pulley (2), and thus a friction loss is reduced. Accordingly, it is possible to ensure an excellent power transmission rate.

In FIG. 8, when the movable sheave (2b) of the drive pulley (2) is made to move close or away to or from the stationary sheave (2a), a wound diameter of the chain (1) is large at the time of moving close thereto and is small at the time of moving away therefrom. In a driven pulley (3), although it is not shown in the drawing, when the movable sheave moves in a direction opposite to the movable sheave (2b) of the drive pulley (2) and the wound diameter of the drive pulley (2) becomes large, the wound diameter of the driven pulley (3) becomes small. Alternatively, when the wound diameter of the drive pulley (2) becomes small, the wound diameter of the driven pulley (3) becomes large. As a result, on the basis of the state where the transmission ratio is one to one (initial value), it is possible to obtain an U/D (under drive) state where the wound diameter of the drive pulley (2) is minimum and the wound diameter of the driven pulley (3) is maximum. Additionally, it is possible to obtain an O/D (overdrive) state where the wound diameter of the drive pulley (2) is maximum and the wound diameter of the driven pulley (3) is minimum.

As shown in FIG. 8, the pin (14) includes a link hold portion (31) of which a sectional shape is uniform and to which the link (11) is press-fitted, and pulley contact portions (32) and (33) which are formed in both ends of the link hold portion (31) and which has inclined surfaces (32a) and (33a) corresponding to the sheave surfaces (2c) and (2d) of the pulley (2). At this time, the upper and lower edge portions of the pin (14) are press-fitted to the upper and lower edge portions of the through-portion (12) of the link (11), and then the pin (14) and the link (11) are coupled to each other. The interpiece (15) does not come into contact with the pulley and the upper and lower edge portions of the interpiece (15) are press-fitted to the upper and lower edge portions of the through-hole (12) of the link (11). Accordingly, the interpiece (15) and the link (11) are coupled to each other.

The power transmission chain (1) is manufactured such that the necessary pins (14) and interpieces (15) are held on a table in a vertical shape and then one sheet or multiple sheets of the links (11) are press-fitted thereto. The press-fitting margin is set in the range of 0.005 mm to 0.1 mm. Then, pretension is loaded on the assembled chain (1).

Figure 3:
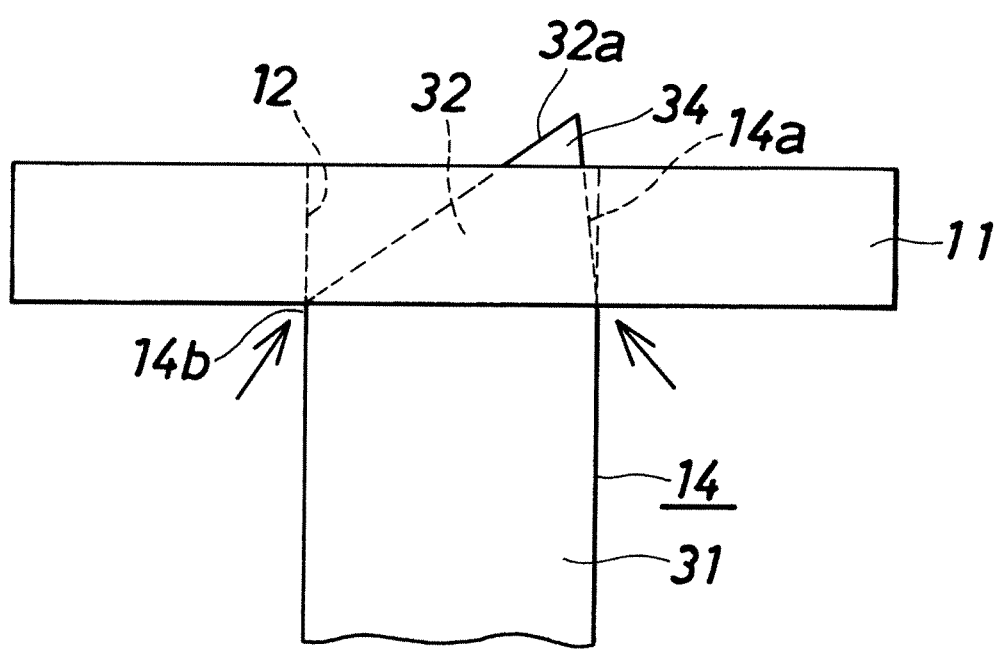
FIG. 3 is a view schematically illustrating a state where the power transmission chain according to the invention is press-fitted to a link.

FIG. 3 illustrates a state where the link (11) is press-fitted to the pin (14) according to the invention. In the end portion of the pin (14) which corresponds to the front end side at the time of carrying out the press-fitting operation, there is provided a guide portion (34) for easily carrying out the press-fitting operation. That is, in the end portion of each pin (14), there are provided inclined surfaces (32a) and (33a) corresponding to the shape of the sheave with which the end surface comes into contact. At this time, there are provided a front end portion upper edge (14a) which is first fitted to the through-hole (12) of the link (11) at the time of carrying out the press-fitting operation and a front end portion lower edge (14b) which is finally fitted to the through-hole (12) of the link (11) at the time of carrying out the press-fitting operation. The front end portion upper edge (14a) is formed in an inclined shape so as to configure the guide portion (34). Accordingly, the press-fitting margin of the front end portion edge (14a) which is located more in the front end side than the front end portion lower edge (14b) is set to 0. Therefore, a stress concentration at the time of carrying out the press-fitting operation is reduced, and thus a deformation and a cut of the link (11) is prevented, so that a strength reduction of the link (11) is prevented. Additionally, a generation amount of an abrasion powder is reduced, and a friction between the links (11) is reduced. Accordingly, it is possible to reduce a bending torque of the chain (1).

Figure 4:
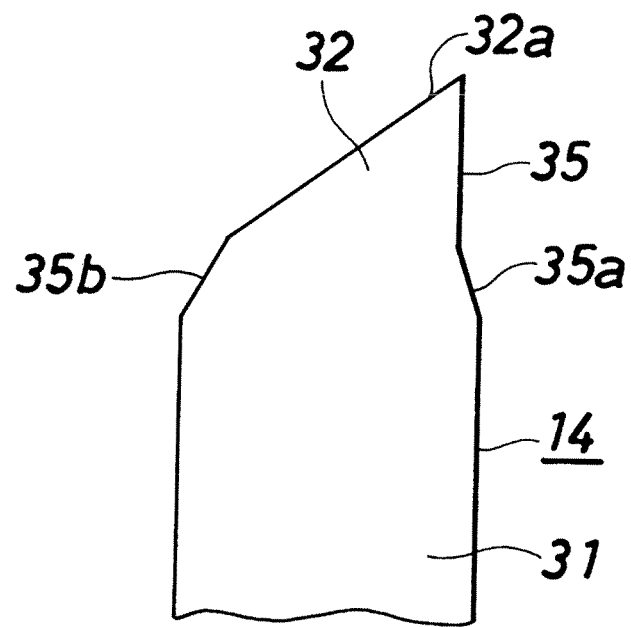
FIG. 4 is a view schematically illustrating a shape of the power transmission chain pin according to another embodiment of the invention.

In the pin (14) shown in FIG. 3, only the front end portion upper edge (14a) is formed in an inclined shape to configure the guide portion (34), compared with a known example. However, the shape of the guide portion is not limited thereto, but may be modified into various shapes so long as the upper and lower edge portions of the pin (14) are press-fitted at the same time. For example, the front end portion upper edge of the pin (14) is eliminated, and also the front end portion lower edge may be eliminated at the same time. The example is shown in FIG. 4. In FIG. 4, at the boundary portion between the upper edge portion of a pulley contact portion (32), which corresponds to the front end side at the time of carrying out the press-fitting operation, and the upper edge of a link hold portion (31), there is provided an inclined surface (35a) of which the press-fitting margin gradually increases. Also, at the boundary portion between the lower edge portion of the pulley contact portion (32) which corresponds to the front end side at the time of carrying out the press-fitting operation and the lower edge of the link hold portion (31), there is provided an inclined surface (35b) of which the press-fitting margin gradually increases. As a result, a guide portion (35) for carrying out the easy press-fitting operation is formed.

Accordingly, a force acting on the inclined surface (35a) of the upper edge and a force acting on the inclined surface (35b) of the lower edge are substantially equal to each other. The press-fitting operation is easier and a stress concentration at the time of carrying out the press-fitting operation is reduced.

FIGS. 5 to 7B illustrate a manufacture method of the power transmission chain pin according to the invention that is suitable for manufacturing the pin (14) having the guide portions (34) and (35). The manufacture method includes a rough sectional shape formation step (see FIG. 5) of drawing a wire rod (which is the same as the known example) so that the section thereof is formed in a substantially oval shape; a rough end portion shape formation step (see FIG. 6) of cutting a continuous bar-like member (W1) which has been subjected to the drawing work into a predetermined length, so that the end surface thereof has a predetermined angle with respect to the axial direction; and a final shape formation step (see FIGS. 7A and 7B) of cold forging a bar-like member (W2) which has been cut into a predetermined length, so as to have a final sectional shape and a final end portion shape.

Figure 5:
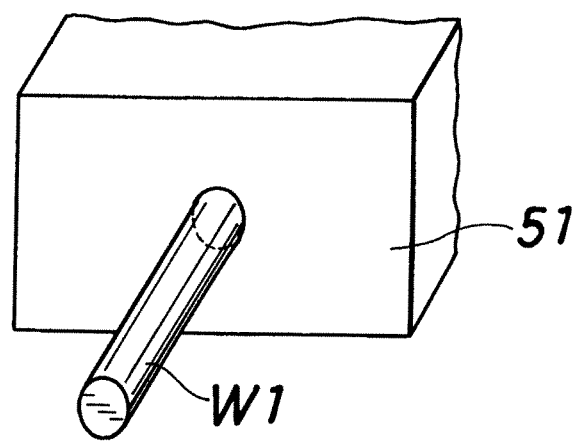
FIG. 5 is a view schematically illustrating a drawing work step which is a first step of a manufacture method of the power transmission chain pin according to the invention.

In FIG. 5, a drawing work die (51) includes a die hole of which a section is formed in an oval (or ellipsoidal) shape. In the drawing work, a bearing steel wire becomes the bar-like member (W1) with a continuous shape and an oval (or ellipsoidal) shape in a sectional view. It is not necessary to particularly manage precision or scar so long as the section is a rough shape. Accordingly, it is possible to remarkably reduce a work cost, compared with a drawing work in which a particular management is necessary to obtain a final shape.

Figure 6:
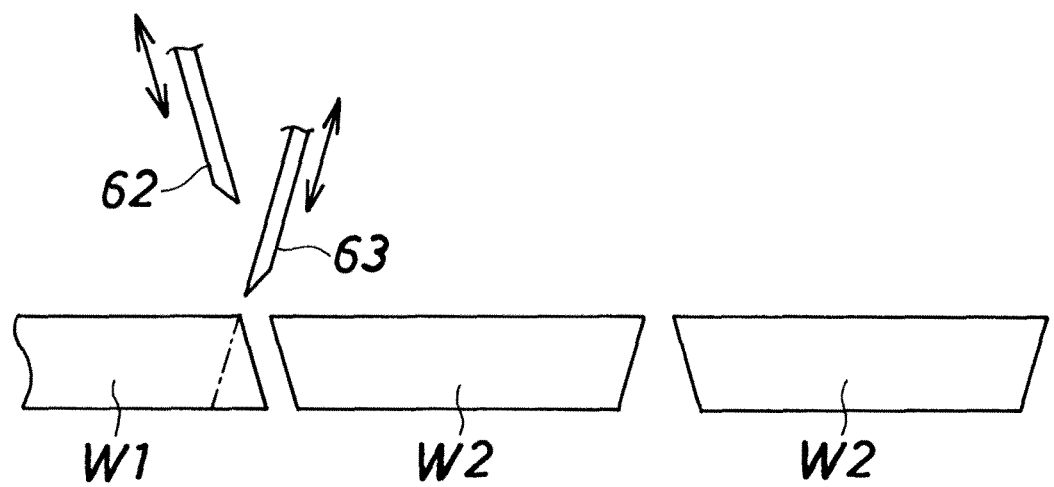
FIG. 6 is a view schematically illustrating a cut step which is a second step of the manufacture method of the power transmission chain pin according to the invention.

In FIG. 6, a cut surface of the bar-like member (W1) with a continuous shape is not formed at a right angle with respect to the axial direction of the bar-like member (W1), but is formed so that both ends are formed at a predetermined angle by first and second cutters (62) and (63). Additionally, in FIG. 6, the upper and lower portions of the bar-like member (W2) of a predetermined length are cut out so as to be disposed on the same side at a normal time. However, in order to obtain the bar-like member (W2) of a predetermined length, the bar-like member (W2) may be cut out so that the upper and lower portions thereof are alternatively disposed.

Figure 7A:
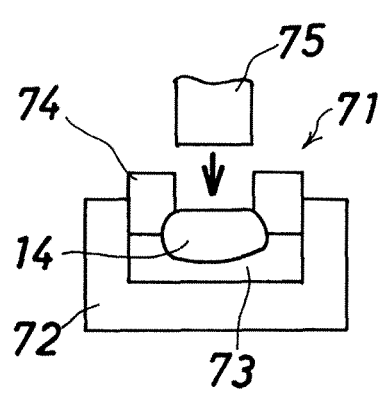
FIGS. 7A and 7B are views schematically illustrating a cold forging step which is a third step of the manufacture method of the power transmission chain pin according to the invention.
Figure 7B:
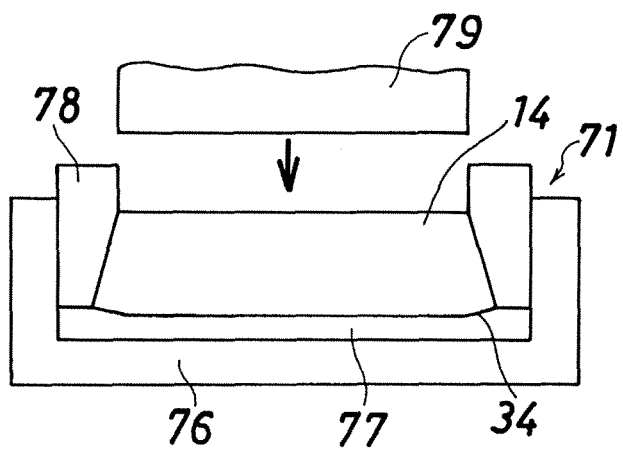

The final shape formation step includes a cold forging step (see FIG. 7A) of a final sectional shape formation for obtaining a final sectional shape by a cold forging work, and a cold forging step (see FIG. 7B) of a final end portion formation for obtaining a final end portion shape by a cold forging work. As shown in FIGS. 7A and 7B, a cold forging device (71) includes holders (72) and (76), lower dies (73) and (77) and upper dies (74) and (78) which are held by the holders (72) and (76), and punches (75) and (79) which can move in the vertical direction. In the lower die (73) used in the cold forging step of the final sectional shape formation, there is provided a concave portion for forming a rolling contact surface of the pin (14). In the upper die (74), there is provided a concave portion for forming upper and lower press-fitting portions of the pin (14). Accordingly, the punch (75) is worked so as to hit a surface opposite to the rolling contact surface. Consequently, the final sectional shape of the pin (14) is formed. Additionally, in a lower die (77) used in the cold forging step of the final end portion formation, there is provided a concave portion for forming the guide portion (34) for carrying out an easy press-fitting operation. In an upper die (78), there is provided a concave portion for forming surfaces (32a) and (33a) coming into contact with the sheave surfaces (2c) and (2d) with a conical shape of the pulleys (2) and (3). Accordingly, the punch (79) is worked so as to hit a surface opposite to the guide portion (34). Consequently, the final end portion shape of the pin (14) is formed. In this way, a grinding (which includes a polishing) work which was necessary for a known end surface treatment work using a grind stone is not necessary. Further, it is possible to obtain a final shape of the pin (14) without a grinding work which is necessary to form the guide portion (34) for a press-fitting operation. Additionally, in FIGS. 7A and 7B, the cold forging step is divided into two steps for a description, but is not limited to the two steps.

Of course, the manufacture method of the pin is applicable to the interpiece (15) in which a limitation of the end surface is less and a guide portion is desirably disposed. Further, the manufacture method is applicable to a pin that is used in a chain in which the first and second pins having the same lengths as each other come into contact with sheave surfaces or a pin that is used in other various type power transmission chains.

What is claimed is:

1. A method comprising:
    drawing a wire rod so as to form a rough sectional shape such that a section thereof is formed in a substantially oval shape;
    cutting the wire rod into a predetermined length so that an end surface thereof has a predetermined angle with respect to an axial direction of the wire rod; and
    cold forging the cut wire rod so as to form a power transmission chain pin having a final sectional shape and a final end portion shape, such that the power transmission chain pin includes a guide portion at least one end portion of the power transmission chain pin in a longitudinal direction thereof, such that a press-fitting margin of the power transmission chain pin gradually increases from the at least one end portion along the longitudinal direction of the power transmission chain pin,
    wherein the guide portion includes a first inclined surface having a first angle with respect to the axial direction and a second inclined surface having a second angle with respect to the axial direction, and the first angle and the second angle are different from each other.

2. A method according to claim 1,
    wherein a lower die used in the cold forging for forming the final end portion shape of the power transmission chain pin includes a concave portion having a shape corresponding to the guide portion of the power transmission chain pin, and an upper die includes a concave portion having a shape corresponding to a surface of the power transmission chain pin coming into contact with a conical sheave surface of a pulley, and
    wherein the final end portion shape of the pin is formed by hitting a surface of the power transmission chain pin opposite to the guide portion by a punch.

3. A method according to claim 2, wherein an upper edge of the power transmission chain pin that corresponds to an outer side of the pulley is longer than a lower edge of the power transmission chain that corresponds to an inner side of the pulley,
    wherein the concave portion of the upper die is formed so that a space is expanded in a lateral side of the power transmission pin, and
    wherein the upper die is disposed such that the concave portion of the upper die is matched with an end face of the power transmission pin after the pin is disposed in the lower die.

4. A method according to claim 1, wherein the cold forging includes striking the power transmission chain pin in a direction other than the axial direction of the power transmission chain.

5. A method according to claim 1, wherein the cold forging includes striking the power transmission chain pin on a side of the power transmission chain pin opposite, in a direction orthogonal to the axial direction, the guide portion.

6. A method according to claim 1, wherein the cold forging includes striking the power transmission chain pin on a side of the power transmission chain pin opposite the guide portion, in a direction other than the axial direction of the power transmission chain pin.

\* \* \* \* \*